Sept. 27, 1966  H. R. FORSMARK  3,274,853
RATCHET DRIVE ROTARY VALVE ACTUATING MECHANISM
Filed Nov. 16, 1962  2 Sheets-Sheet 2
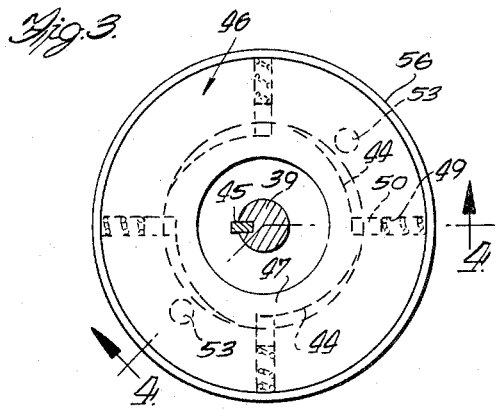
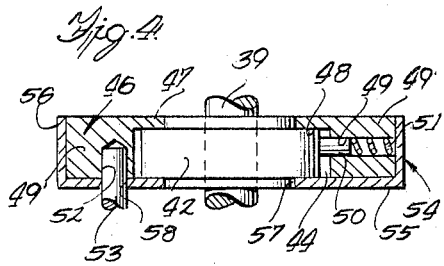
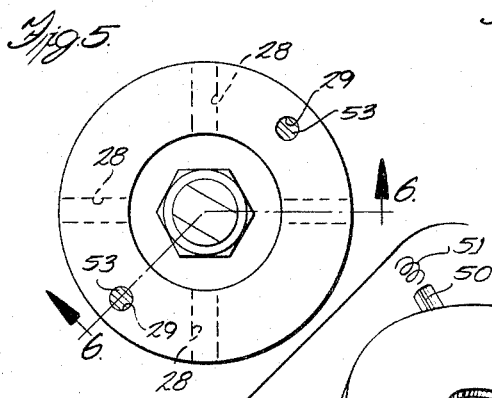
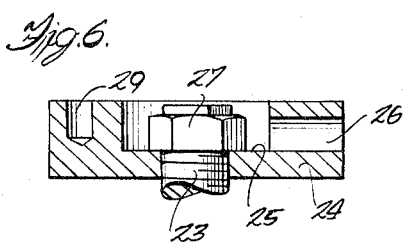
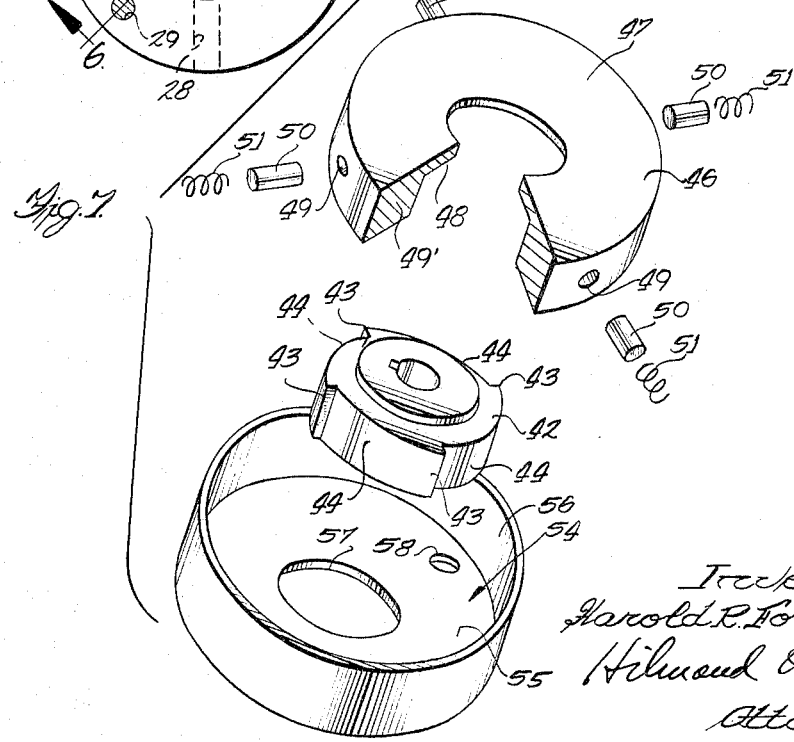
Inventor
Harold R. Forsmark
Hilmond O. Vogel
Attorney

United States Patent Office 3,274,853
Patented Sept. 27, 1966

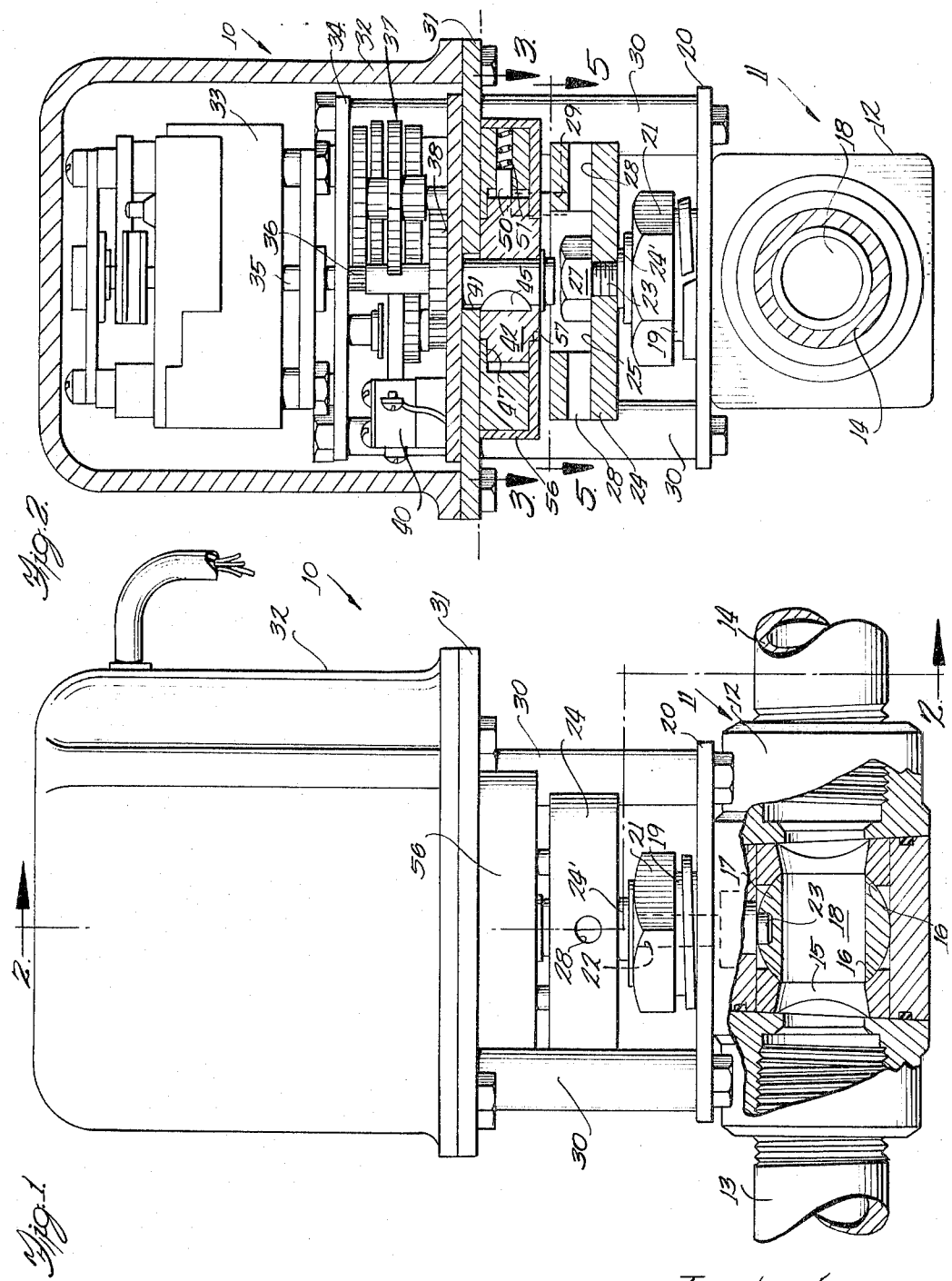

3,274,853
RATCHET DRIVE ROTARY VALVE
ACTUATING MECHANISM
Harold Robert Forsmark, Elmhurst, Ill., assignor to Calco
Manufacturing Company, a corporation of Illinois
Filed Nov. 16, 1962, Ser. No. 238,133
3 Claims. (Cl. 74—625)

This invention relates to a rotary valve actuating mechanism and more particularly relates to an improved drive connection between an electric motor and a ball-type valve.

A primary object of this invention is to provide an improved drive connection between an electric motor and a rotary valve for opening and closing said valve.

Another object is to provide an improved rotary drive mechanism for rotating a valve, the said mechanism accommodating any misalignment which may occur between the drive shaft of an electric motor and the valve stem of the rotary valve.

A still further object is to provide an improved rotating connection between the shaft of an electric motor and the stem of a rotary valve, the said connection porviding for opening and closing the valve and for permitting independent manual opeartion of the valve in the event of electric motor failure.

It is still another object to provide an improved valve actuating mechanism for rotating a ball-type valve, the said mechanism including a ratchet drive which is supported on the shaft of the electric motor and which will, upon rotation of the shaft, rotate the valve stem of a ball-type valve, the said ratchet mechanism also accommodating manual movement of the ball-type valve in the event that the electric motor is in a stopped position.

These and other objects will become more readily apparent from a reading of the specification when examined in connection with the accompanying sheets of drawings:

In the drawings:

FIGURE 1 is a side elevational view of a valve actuating mechanism and ball-type valve embodying the invention;

FIGURE 2 is a cross sectional view taken along the line 2—2 of FIGURE 1;

FIGURE 3 is a detail sectional view taken along the line 3—3 of FIGURE 2;

FIGURE 4 is a cross sectional view taken along the line 4—4 of FIGURE 3;

FIGURE 5 is a cross sectional view showing a driven disk taken along the line 5—5 of FIGURE 2;

FIGURE 6 is a cross sectional view taken along the line 6—6 of FIGURE 5; and

FIGURE 7 is an exploded view of a ratchet drive mechanism for actuating a ball-type rotary valve.

Referring now particularly to FIGURES 1 and 2, a valve actuating mechanism is generally referred to by the reference character 10 the same being operative to actuate a ball-type valve generally designated at 11. The valve 11 comprises a housing 12 having conduits 13 and 14 which are adapted to be placed in the communication by means of a valve passage 15 provided in the valve housing 12. The valve passage 15 is adapted to be opened and closed by means of a valve seat 16 cooperating with a valve ball element 17. The valve ball element 17 is provided with a suitable opening 18 which in the position shown in FIGURE 1 provides for communication between the conduits 13 and 14.

The valve housing 12 is provided with an upwardly extending threaded boss 19 on which is supported an apertured mounting plate 20 rigidly secured thereto by means of a nut 21 threaded onto the threaded boss 19.

The threaded boss 19 includes a vertically extending bore 22 within which a valve stem 23 is rotatably positioned. The valve stem 23 is secured to a driven disk generally designated at 24. The driven disk 24 is seated on a suitable washer 24' rigidly connected to the stem 23. The driven disk 24 is provided with a recess 25 which supports a nut 27 secured to the end of the stem 23 for rigidly securing the disk so that upon rotation of the disk 24 the stem 23 is also rotated. The disk 24 is also provided with suitable bores 28 as indicated.

Vertically extending posts 30 project upwardly from the plate 20 and in turn support a horizontal plate 31 on which a motor housing 32 is positioned. The motor housing 32 in turn supports a motor 33 by means of supporting structure 34.

The motor 33 may be of conventional construction and includes a shaft 35 having a gear end 36 which drives a suitable speed reduction gear train 37 in turn driving a gear 38 which rotates a shaft 39 and actuates a cam switch generally designated at 40. The plate 31 is provided with an opening 41 through which the shaft 39 projects for rotation.

A ratchet risk 42 is secured for rotation with the shaft 39, the said ratchet disk 42 comprising four ratchet teeth 43 which extend outwardly from a recessed cam surface 44. A key 45 suitably connects the disk 42 for rotation with the shaft 39. A cog carrier 46 is rotatable concentrically with the shaft 39, the cog carrier 46 comprising an inwardly projecting flange 47 and having an annular recess 48. The cog carrier 46 comprises four circumferentially spaced and inwardly extending open end bores 49, the said bores 49 being provided in a downwardly extending annular thick flange 49' of the cog carrier 46. Cogs 50 are slidably positioned within the bores 49 and are urged in the direction of the ratchet disk 42 by means of captive springs 41. Thus, the cogs 50 are constantly urged into engagement with the ratchet teeth 43. As best shown in FIGURES 4 and 5, vertically extending bores 52 are provided in the flange 49', the said bores 52 having contained therein pins 43 which are adapted to rotate with the cog carrier 46.

A cylindrical housing 54 is concentric with the ratchet disk 42 and cog carrier 46, the said housing 54 comprising a base 55 having an outward circumferentially extending flange 56. The base 55 is provided with an opening 57 and includes openings 58. The housing 54 is suitably secured in the position shown in FIGURE 4 to the cog carrier 46 and the pins 53 extend through the openings 58 and in turn are contained within the openings 29 of the driver disk 24.

In the operation, the motor 33 upon being connected to a suitable source of power, rotates the shaft 35 and gear 36 actuating the gear train 37 to drive the gear 38 which in turn causes rotation of the gear 38 at a reduced speed. The gear 38 similarly drives a cam-type actuated switch generally designated at 40, the said switch providing for continued rotation of the shaft 39 until it has rotated 90° at which time the switch is opened and rotation ceases and whereupon the ball element 17, as shown in FIGURE 1, will have been turned to a closed position.

Thus the disk 42 is rotating and the teeth 43 being in engagement with the cogs 50 cause rotation of the cog carrier 46 which in turn causes rotation of the pins 53 which serve to rotate the driver disk 24. As the disk 24 rotates the stem 23 is rotating causing closing of the ball-type valve while movement of the motor is in the same direction.

In the event of power failure or if for any reason it is desired to actuate the driver disk 24 manually and independently of the motor 33, it is a simple matter for the operator to manually grasp the outside of the housing 54 and to rotate it is in a counterclockwise direction, as shown in FIGURE 3, whereupon the cogs 50 move on the recessed cam surfaces 44, and the housing 56 can thus continue to move with the cog carrier 46 to effectuate such manual operation. Thus, if for any reason the motor is stopped such manual movement of the valve may be achieved.

Thus, it is believed obvious that the objects of the invention have been fully achieved and that changes and improvements may be made without departing from the spirit of the invention as disclosed or from the scope thereof as defined in the appended claims.

What is claimed is:

1. A coupling for a motor and valve assembly with said motor including a driver shaft and said valve including a rotatable driven valve stem for rotating said valve to open and closed positions, said stem being coaxially positioned relative to said driver shaft, comprising:
    (a) a rotatable driven member connected to said stem to rotate the same and having a horizontal portion extending radially outwardly from said stem,
    (b) a ratchet member connected to said driver shaft for rotation therewith, said ratchet member including a plurality of teeth and adjacent recessed cam portions sloping outwardly gradually to the peripheral surface of said ratchet member,
    (c) a cylindrical cog carrier rotatably on and coaxially positioned relative to said ratchet member,
    (d) said cog carrier including a central cylindrical recess receiving said ratchet member and an outer circumferentially extending flange,
    (e) said flange including a plurality of circumferentially spaced radially extending bores,
    (f) a cog slidably disposed in each bore,
    (g) means in said bores urging said cogs into said recessed cam portions,
    (h) and means on said cog carrier connecting said carrier to said horizontal portion of said driven member, whereby rotation of said shaft in one direction said cog carrier and driven member are rotated,
    (i) said cog carrier and said driven member being rotatable in the same direction manually when said ratchet member and driver shaft are stationary.

2. A coupling for a motor and valve assembly with said motor including a driver shaft and said valve including a rotatable driven valve stem for rotating said valve to open and closed positions, said stem being coaxially positioned relative to said driver shaft, comprising;
    (a) a rotatable driven member connected to said stem to rotate the same, and having a horizontal portion extending radially outwardly from said stem,
    (b) a ratchet member connected to said driver shaft for rotation therewith, said ratchet member including at least one tooth and an adjacent recessed cam portion,
    (c) a cylindrical cog carrier rotatably and coaxially positioned relative to said ratchet member,
    (d) said cog carrier including a central cylindrical recess receiving said ratchet meber and an outer circumferentially extending flange,
    (e) said flange including a radially extending bore;
    (f) a cog slidably disposed in said bore,
    (g) means in said bore urging said cog into said recessed cam portion,
    (h) and means on said cog carrier connecting said carrier to said horizontal portion of said driven member, whereby rotation of said shaft in one direction said cog carrier and driven member are rotated,
    (i) said cog carrier and said driven member being rotatable in the same direction manually when said retchet member and driver shaft are stationary.

3. A coupling in accordance with claim 2, said cog carrier including means overlapping said recess and slidably engaging said ratchet member whereby said cog carrier is supported on said ratchet member.

References Cited by the Examiner
UNITED STATES PATENTS

| | | | |
|---|---|---|---|
| 651,706 | 6/1900 | Forkes | 192—46 |
| 1,162,253 | 11/1915 | Richard | 74—625 |
| 2,226,169 | 12/1940 | Koehler | 251—130 X |
| 2,523,825 | 9/1950 | Hartley | 251—130 X |
| 2,621,678 | 12/1952 | Snyder | 251—130 |
| 2,848,904 | 8/1958 | Wilson et al. | 74—625 |

M. CARY NELSON, *Examiner.*

J. T. DEATON, W. S. RATLIFF, *Assistant Examiners.*

BROUGHTON G. DURHAM, *Primary Examiner.*

UNITED STATES PATENT OFFICE
CERTIFICATE OF CORRECTION

Patent No. 3,274,853 September 27, 1966

Harold Robert Forsmark

It is hereby certified that error appears in the above numbered patent requiring correction and that the said Letters Patent should read as corrected below.

In the grant, lines 2 and 3, for "assignor to Calco Manufacturing Company, a corporation of Illinois," read -- assignor, by mesne assignments, to The Lunkenheimer Company, of Cincinnati, Ohio, a corporation of Delaware, --; line 12, for "Calco Manufacturing Company, its successors" read -- The Lunkenheimer Company, its successors --; in the heading to the printed specification, lines 4 and 5, for "assignor to Calco Manufacturing Company, a corporation of Illinois" read -- assignor to The Lunkenheimer Company, Cincinnati, Ohio, a corporation of Delaware --.

Signed and sealed this 22nd day of August 1967.

(SEAL)
Attest:

ERNEST W. SWIDER
Attesting Officer

EDWARD J. BRENNER
Commissioner of Patents